United States Patent

Page

[15] 3,657,788

[45] Apr. 25, 1972

[54] INTEGRATED CIRCUIT INSERTING MACHINE

[72] Inventor: Ray A. Page, Walnut Creek, Calif.

[73] Assignee: SCM Corporation

[22] Filed: June 15, 1970

[21] Appl. No.: 46,348

[52] U.S. Cl. ....................................................29/203 R

[51] Int. Cl. ....................................................H05k 13/00

[58] Field of Search ..............29/203 R, 203 B, 203 D, 203 P

[56] References Cited

UNITED STATES PATENTS 3,564,691 2/1971 Ackerman..........................29/203 B

*Primary Examiner*—Thomas H. Eager

*Attorney*—Armand G. Guibert

[57] ABSTRACT

A machine is disclosed for inserting integrated circuit packages or IC's into reusable plastic carriers for protection and for facilitation of further handling by automatic equipment in product fabrication. The machine operates by a shuttle action in which a plastic carrier is picked up at one end of an oscillation cycle and transferred to an insertion station in one motion, while an IC is picked up at the other end of the oscillation for transfer to a position beneath the insertion station, with the IC being inserted during the return portion of the cycle in which it has been moved to the position under the plastic carrier. The machine also includes an IC remover so that carriers containing IC's which have been tested and rejected can be mixed with empty carriers in the supply line and stripped of the defective IC just prior to insertion of a new IC.

22 Claims, 6 Drawing Figures

PATENTED APR 25 1972 3,657,788

INVENTOR.
RAY A. PAGE
BY Armand G. Guibert
HIS AGENT

INTEGRATED CIRCUIT INSERTING MACHINE

BACKGROUND OF THE INVENTION

1. Field of the Invention

The subject invention relates generally to apparatus for insertion of delicate or fragile items into protective enclosures and, more particularly, to high speed, low cost devices of that nature.

2. Description of the Prior Art

Assembly apparatus of the type utilizing a turntable as the workpiece mover is well known. Such equipment is generally bulky, has many complex moving parts, and requires precision indexing. As a result, it is generally costly.

BRIEF SUMMARY OF THE INVENTION

It is an object of this invention to provide an improved low cost assembly apparatus.

It is a particular object of this invention to provide a compact assembly apparatus having an oscillatory motion for the pickup and orientation of a holder and a device to be inserted therein, with the insertion motion occurring during part of the oscillation.

In brief, the invention relates to assembly apparatus for insertion of devices into jackets, which includes a respective pair of sources containing members and jackets for supply to the apparatus; and specifically the combination of a base, a shuttle, a drive unit for operating the shuttle in a cycle of oscillation through a plurality of positions with respect to the base, mechanism cooperating with a discrete one of the pair of sources to pick up an individual one of the contents of that source in response to location of the shuttle in a predetermined one of the positions and to transfer that one of the contents of the discrete source to an insertion station during a cycle of oscillation, mechanism cooperating with the other source to pick up an individual one of the contents of that source in response to location of the shuttle at another position and to transfer that one of the contents of the other source to a location adjacent to the insertion station during the cycle of oscillation, and mechanism operative subsequent to the transfers and responsive to oscillation of the shuttle to insert a device into a jacket.

DESCRIPTION OF THE PREFERRED EMBODIMENT

The embodiment of the machine according to the invention which will now be described is specifically adapted to insert integrated circuit packages into plastic carriers, but is generally adapted to insertion of objects into jackets. Furthermore, in the embodiment described, the integrated circuit packages are of the type referred to as "Dual In-Line Packages" or "DIP's," that is, packages with a central body containing the integrated circuit and having a number of identical formed leads protruding laterally to each side of the central body.

Figure 1:
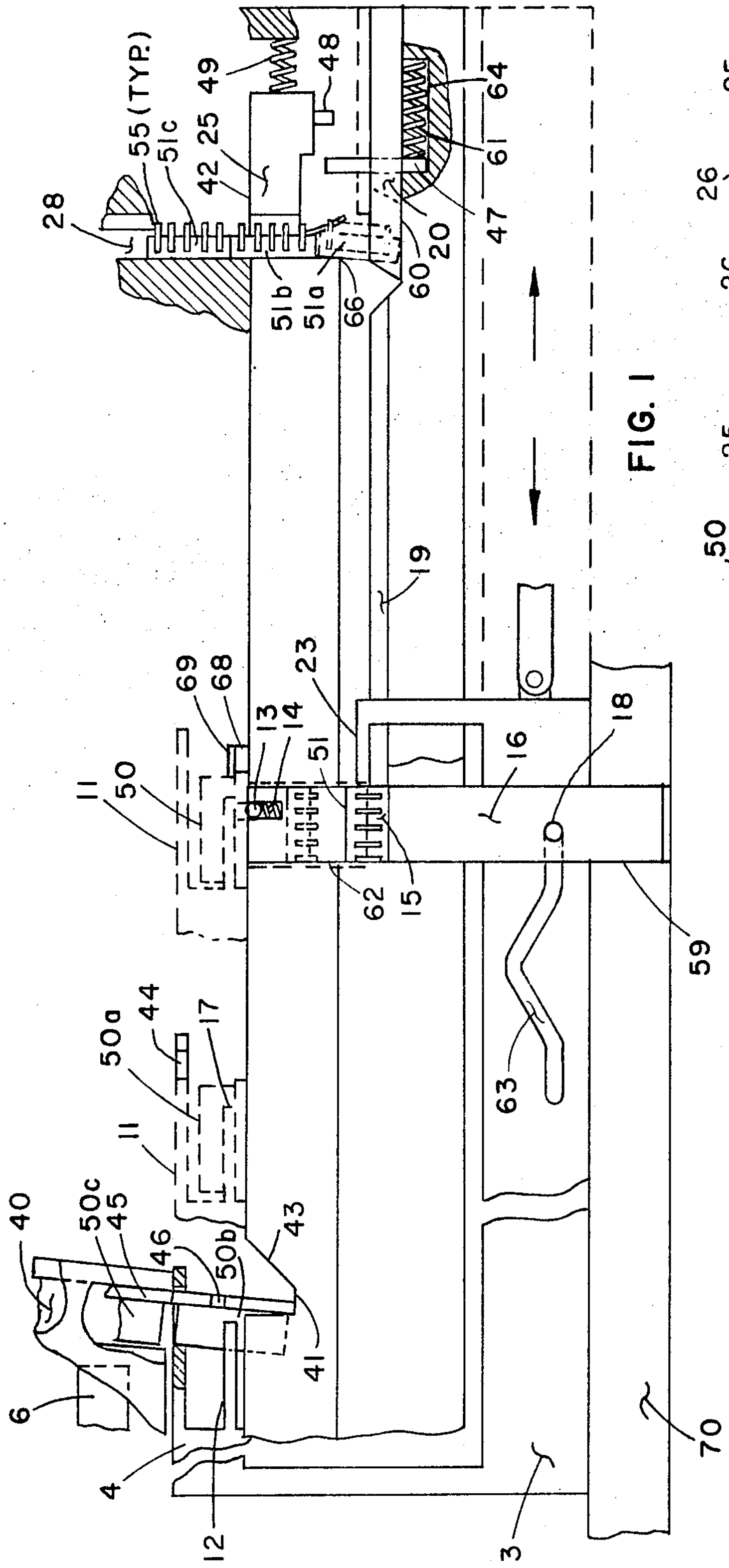
FIG. 1 shows an elevation view of the elements of the apparatus according to the invention, with portions cut away for purposes of showing internal details.

FIG. 1 shows two tracks 40 and 28, respectively adapted to feed carriers 50 and DIP's 51 to the machine for positioning so that DIP 51 can be inserted automatically into the carrier 50. The carriers 50 and DIP's 51 can be supplied to their respective tracks 40 and 28 by gravity feed from vendor-loaded tube or from a vibratory supply bowl (neither shown, but both well known in the art). The carriers 50 loaded into carrier track 40 and slide down track 40 until the first carrier 50 stops on surface 41 of the bed 10 of the machine (assuming the positions of the machine members shown in full line in FIG. 1, there positions corresponding to one end of an oscillation of a shuttle 3 and the next motion of shuttle 3 being to the right). The bed 10 is stationary, of course. The DIP's 51 are loaded into track 28 and slide down track 28 until the first DIP 51 stops on the upper surface 42 of the clamp member 25 (again assuming the member positions to be those shown in full line in FIG. 1).

When shuttle 3 moves rightward, driven by a known (hence, not shown) oscillating mechanism, a push member 4 (hereinafter referred to as carrier "pusher" 4) -- rigidly fastened to the shuttle 3 -- moves rightward also, toppling the first carrier 50 (actually **50*b* in FIG. 1) clockwise onto a ramp surface 43. Toppling occurs because two carrier guide arms 11 -- attached to pusher 4 and embracing the body of the first carrier 50 -- are provided with notches 44 straddling a flange 45 of the first carrier 50. The notches 44 permit the carriers 50 to pass between the arms 11 when pusher 4 is in the initial position shown. The next carrier 50 (actually 50*c* in FIG. 1), which had been resting on the upper end of flange 45 of the preceding carrier 50 (50*b* in FIG. 1), now rests upon the upper surface of carrier guide 11, while the preceding carrier 50*b* is urged by pusher 4 into the dotted-line position shown for carrier 50*a* in which two other arms 12 attached to pusher 4 and also embracing the body of that carrier provide close lateral and vertical positioning of the carrier. The tips 17 of arms 12 engage the flanges 45 and contribute to the force causing the carrier 50 to ascend the ramp 43, and the carrier 50 to complete a full 90° clockwise rotation as carrier 50 is moved rightward to a position where -- at the end of the stroke of carrier pusher 4 -- a detent 13 urged by a spring 14 locks the carrier 50 in a predetermined position, referred to hereinafter as the insertion station. Detent 13 is shown as being mounted vertically (but can equally well be mounted horizontally) for purposes of engaging a notch 46 molded into the flange 45 of each carrier 50**.

Figure 6:
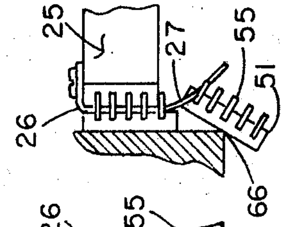
FIG. 6 is an enlarged side view of the clamping member of FIG. 5.
Figure 3:
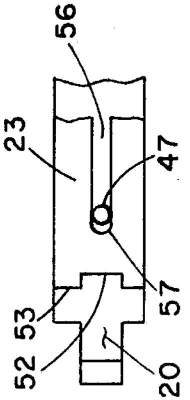
FIG. 3 shows a plan view of the two-piece member for transfer of the integrated circuit package, comprising an orientation member and a pusher member operating with a delayed action relative to the orientation member.

As shuttle 3 nears the end of its rightward travel a pin 47, projecting above and below an orientation member 20 (referred to hereinafter as DIP flipper 20) and having its upper projection located in a slot 56 (see FIG. 3) of another push member 23 (affixed to the other end of shuttle 3) and referred to hereinafter as DIP "pusher" 23, is picked up by the end 57 of slot 56. Pin 47 is carried rightward against the force of a compression spring 61, the force being exerted laterally against the lower projection of pin 47. At the last of the rightward motion of shuttle 3, the upper projection of pin 47 in turn engages a dependent pin 48 attached to clamp 25 and moves the latter rightward against the force of a spring 49 which has been urging clamp 25 leftward. This rightward motion of clamp 25 frees DIP **51*a* and allows it to drop until stopped by surface 60 on the bed 10 of the machine and permits the next DIP, 51*b*, to come into position where clamp 25 will engage it as shuttle 3 reverses direction, travelling leftward then, as will be described. A light cantilevered wire spring 26, attached to clamp 25 as shown in FIG. 6, has a central portion which projects far enough downward to catch the upper end of DIP 51*a* and thus to prevent it from toppling clockwise. Such toppling would allow the next DIP 51*b* to drop further than it should -- namely, into a position where it would interfere with the loading action to be performed on 51*a*. Spring 26** also serves another purpose, to be discussed subsequently.

The shuttle 3 now begins to move leftward, DIP pusher 23 accordingly allowing pin 47 to move leftward also and eventually to disengage from dependent pin 48 which has been following it under the urgence of spring 49. At this point, clamp 25 will hold DIP 51*b* immobile in track 28.

Figure 5:
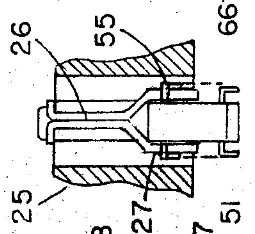
FIG. 5 shows an enlarged end view of a clamping member to which a guide-spring is attached, the clamping member holding the integrated circuit package next to be supplied.
Figure 4:
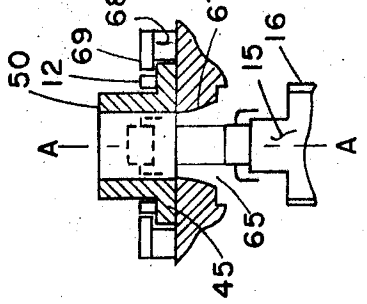
FIG. 4 shows a partial elevational cross section of the insertion station.
Figure 2:
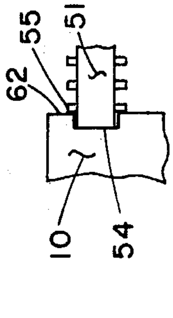
FIG. 2 shows means for aligning the end of the integrated circuit package prior to insertion into a carrier.

By virtue of the fact that DIP flipper 20 projects beyond the end 52 of pusher 23, the former will engage the DIP 51*a* first, moving DIP 51*a* against bottom corner 66 of track 28, thereby causing DIP 51*a* to topple clockwise against the resistance of spring 26 which flexes in the process. The shape of the spring 26 is quite important, because it serves a second purpose, as mentioned previously. A simple cantilever spring, while satisfactory for the first purpose, does not solve a further problem in that it does not prevent possible twisting of the DIP 51 with attendant possibility of jamming the mechanism and damaging the DIP 51. For this reason, as shown in FIGS. 5 and 6, the lower portion 27 of wire spring 26 is made in the form of a two-tined fork, the spacing between the tines and the thickness of the wire being such as to catch between the leads 55 of DIP 51 and the body of the DIP and thus stabilize it with respect to rotation. The flexing of spring 26 then continues as flipper 20 moves further leftward until the DIP 51 has rotated to the point where the horizontal component of force on the DIP 51 exceeds the horizontal frictional contact force at the corner 66, at which point the energy stored in spring 26 starts the DIP 51*a* toward the track 19 leading to the insertion station. When DIP 51*a* is released by spring 26, it falls astraddle flipper 20 and between the projections 53 to either side of the end 52 of pusher 23, which then engages DIP 51*a* and pushes it onto a track 19 aligned with the plane AA of FIG. 4. As pusher 23 continues to move leftward, DIP flipper 20 will cease to follow when the lower end of pin 47 reaches the end 58 of groove 64 in which pin 47 travels, urged by spring 61. Pusher 23 and DIP 51*a* continue leftward until the end of the return travel of shuttle 3. At this point, DIP 51 has left track 19 and rests on inserter 15, the leftmost pair of formed leads 55 on each DIP 51 engaging a surface (see FIG. 2) formed by the lands 62 adjacent a vertical slot 54 in the bed 10 upon which the carrier 50 has been positioned. DIP 51*a* is now located directly beneath a carrier 50 by virtue of an alignment determined by the contact between the leftmost pair of leads 55 and vertical lands 62. At this time, shuttle 3 will have completed one cycle of oscillation and one carrier 50 and one DIP 51 will be in alignment, both being centrally located with respect to plane AA of FIG. 4.

As shuttle 3 begins rightward motion in a succeeding cycle, by virtue of a camming slot 63 in the shuttle 3, the inserter 15 -- provided with legs 16 riding in a vertical guideway 59 formed in the support 70 for the shuttle, a pin and roller combination 18 being fastened to the legs 16 and passing through cam slot 63 -- will go through a vertical oscillation with the net result that DIP 51 will be raised and inserted into carrier 50. Lateral alignment of DIP 51 is provided during insertion (see FIG. 4) by means of the tapered sides 67 of the throat in the passage 65 which they form with slot 54 to guide DIP 51 into carrier 50. During the insertion portion of the cycle, through the arms 12 no longer embrace carrier 50, it is retained by flanges 69 of a pair of blocks 68 (the forward one not shown in FIG. 1 for reasons of clarity) which are located on either side of the insertion station. The flanges 69 overlie flange 45 of carrier 50. The blocks 68 thus lie adjacent opposite sides of carrier 50 and assist in defining its position.

It should be noted that when shuttle 3 reaches the left-hand end of its cycle of motion, i.e., its initial position, the notches 44 on carrier guides 11 move into position beneath flange 45 of succeeding carrier 50*c* which has been resting on the upper surfaces of guides 11 up to this point. A passage now being open beneath carrier 50*c*, that carrier will drop through, stopping at surface 41. The succeeding carrier 50 will follow immediately behind and will be held with its lowest part clear of the upper edges of the notches 44, as explained previously.

The renewed rightward motion of shuttle 3 causes clockwise toppling of the next carrier 50*c* onto ramp 43 -- as before -- and ultimately moves it into position to displace the previous carrier 50, which now has a DIP 51 inserted in it, and forces that carrier into a discharge chute (not shown) or other disposal means for carriers which have completed the DIP insertion process. As shuttle 3 completes its second rightward motion, carrier 50*c* will be positioned in the insertion station and the next DIP 51*b* will be released and in turn allowed to drop down into contact with surface 60, permitting DIP 51*c* immediately following to come into position where clamp 25 will engage it and hold it in readiness for the next cycle. As shuttle 3 returns in the second half of this second cycle, DIP 51*b* will be turned clockwise and moved leftward along track 19 onto inserter 15, where it will be in position under the prepositioned carrier 50. There will be another vertical oscillation of inserter 15 as shuttle 3 moves leftward, but this will not have any effect because no DIP 51 is positioned on inserter 15 at the time. The cycling will thereafter be continued as long as carriers and DIP's are available.

It should be remarked that if for some reason a carrier 50 containing a DIP 51 should be present in track 40, this will not cause problems because rightward motion of shuttle 3 is also used to operate an ejector 6 (rigidly attached to pusher 4 or operated by a mechanism similar in structure to that described for clamp 25, for example) which passes through each carrier 50 as it is being held above pusher 4 by abutment of flange 45 with the upper surface of pusher 4 during the rightward motion of shuttle 3. Thus, no carrier 50 can be moved into the insertion station with a DIP 51 already inserted in it. Conversely, if a group of carriers with DIP's inserted is obtained from the reject bin of a testing station, say, these carriers can be inserted into the machine and each reject DIP 51 removed through the sequential operation of the ejector 6. Empty carriers 50 can thus be obtained for further loading with new DIP's 51, the rejected DIP's being disposed of through a separate chute.

In the event a carrier 50 has not been positioned for loading, DIP 51 will go through the insertion cycle, being raised to the area normally occupied by carrier 50. Prongs 55 will spring outward to normal position (having been compressed by action of tapered sides 67) causing DIP 51 to remain on top of bed 10. The next machine cycle will move a carrier 50 into the area occupied by DIP 51, forcing it into the previously-mentioned discharge chute without causing jam or malfunction of the machine or damage to the DIP 51.

I claim:

1. In assembly apparatus for insertion of devices into jackets, including a respective pair of sources containing devices and jackets for supply to the apparatus; the combination of a base, a shuttle, drive means for operating said shuttle in a cycle of oscillation through a plurality of positions with respect to said base, means cooperating with a discrete one of said pair of sources to pick up an individual one of the contents of said discrete source in response to location of said shuttle in a predetermined one of said positions and to transfer said one of the contents of said discrete source to an insertion station during a said cycle of oscillation, means cooperating with the other of said pair of sources to pick up an individual one of the contents of said other source in response to location of said shuttle at another of said positions and to transfer said one of the contents of said other source to a location adjacent to said insertion station during a said cycle of oscillation, and means operative subsequent to said transfers and responsive to said oscillation of the shuttle to insert a said device into a said jacket.

2. An assembly apparatus as defined in claim 1, wherein said insert means comprises a cam surface on said shuttle and a cam follower coupled to an insert member operative upon a said device.

3. An assembly apparatus as defined in claim 1 wherein said cycle has first and second halves, said pick-ups and transfers occur during respective halves of said cycle.

4. An assembly apparatus as defined in claim 3 wherein said discrete one of the sources supplies a said jacket during said first half of the cycle and said other of the sources supplies a device during said second half of the cycle.

5. An assembly apparatus as defined in claim 4 wherein said means to insert the device into the jacket are operative during the first half of a cycle of operation succeeding the cycle in which said device and said jacket are transferred.

6. An assembly apparatus as defined in claim 3 wherein said means cooperating with said sources comprise respective push members rigidly connected to said shuttle, each said push member having projections embracing the individual one of the contents of the respective source for pushing said one toward said insertion station in a respective half cycle.

7. An assembly apparatus as defined in claim 6 wherein said push member cooperating with said discrete source comprises a pair of arms embracing said individual one of the contents of said source in an initial position of the shuttle to guide said individual one of the contents to said insertion station during said first half cycle, together with means to receive and retain said individual one of the contents during said first half cycle.

8. An assembly apparatus as defined in claim 7 wherein said push member cooperating with said other source includes a preceding orienting portion yieldably coupled thereto and cooperating with means on said other source to rotate said individual one of the contents of said other source, and further including a track, an extension of said track comprising said insert means; and further means cooperating with said rotated individual one of the contents to deposit said one of the contents on said track.

9. An assembly apparatus as defined in claim 8 wherein said means cooperating with said preceding orienting portion comprises a resilient member.

10. An assembly apparatus as defined in claim 5 wherein said insert means comprises a cam surface on said shuttle and a cam follower coupled to an insert member operative upon a said device.

11. In assembly apparatus for insertion of integrated circuit packages into carriers, including a respective pair of sources containing packages and carriers for supply to the apparatus; the combination of a base, a shuttle, drive means for operating said shuttle in a cycle of oscillation through a plurality of positions with respect to said base, means cooperating with said source of carriers to pick up an individual carrier in response to location of said shuttle in a predetermined one of said positions and to transfer said carrier to an insertion station during a said cycle of oscillation, means cooperating with the source of packages to pick up an individual package in response to location of said shuttle at another of said positions and to transfer said package to a location adjacent to said insertion station during a said cycle of oscillation, and means operative subsequent to said transfers and responsive to said oscillation of the shuttle to insert said package into said carrier.

12. An assembly apparatus as defined in claim 11 wherein said insert means comprises a cam surface on said shuttle and a cam follower coupled to an insert member operative on a said package.

13. An assembly apparatus as defined in claim 11 wherein said cycle has first and second halves, and said pick-ups and transfers occur during respective halves of said cycles.

14. An assembly apparatus as defined in claim 13 wherein said carrier source supplies a carrier during said first half of the cycle and said package source supplies a package during said second half of the cycle.

15. An assembly apparatus as defined in claim 14 wherein said means to insert the package into the carrier are operative during the first half of a cycle of operation succeeding the cycle in which said package and said carrier are transferred.

16. An assembly apparatus as defined in claim 15 wherein said insert means comprises a cam surface on said shuttle and a cam follower coupled to an insert member operative upon a said package.

17. An assembly apparatus as defined in claim 13 wherein said means cooperating with said sources comprise respective push members rigidly connected to said shuttle, each said push member having projections embracing an individual one of the contents of the respective source for pushing said one toward said insertion station in a respective half cycle.

18. An assembly apparatus as defined in claim 17 wherein said push member cooperating with said carrier source comprises a pair of arms embracing said carrier in an initial position of the shuttle to guide said individual one of the contents to said insertion station during said first half cycle, together with means at said insertion station to receive and retain said carrier.

19. An assembly apparatus as defined in claim 18 wherein said push member cooperating with said source of packages includes a preceding orienting portion yieldably coupled thereto and cooperating with means on said other source to rotate said individual one of the contents of said other source, and further including a track, an extension of said track comprising said insert means; and further means cooperating with said rotated individual one of the contents to deposit said one of the contents on said track.

20. An assembly apparatus as defined in claim 19 wherein said means cooperating with said preceding orienting portion comprises a resilient member.

21. An assembly apparatus as defined in claim 20 wherein said packages have a central body with a plurality of formed leads projecting laterally therefrom, and said resilient member comprises a spring having a forked tip portion with two tines, said tines cooperating with the portion of the leads between said form and said body.

22. An assembly apparatus as defined in claim 19 wherein said insert means comprises a cam surface on said shuttle and a cam follower coupled to said track extension.

* * * * *